United States Patent
Tsukui

(10) Patent No.: US 10,241,558 B2
(45) Date of Patent: Mar. 26, 2019

(54) ADJUSTING POWER STATES FOR IMPROVED DEVICE PERFORMANCE

(71) Applicant: SEIKO EPSON CORPORATION, Tokyo (JP)

(72) Inventor: Shinobu Tsukui, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 78 days.

(21) Appl. No.: 15/465,745

(22) Filed: Mar. 22, 2017

(65) Prior Publication Data

US 2017/0285724 A1 Oct. 5, 2017

(30) Foreign Application Priority Data

Apr. 1, 2016 (JP) .................................. 2016-074038

(51) Int. Cl.
*G06F 1/00* (2006.01)
*G06F 1/3237* (2019.01)
*G06F 1/3287* (2019.01)
*G06F 1/324* (2019.01)
*G06F 1/3234* (2019.01)
*G06K 15/00* (2006.01)

(52) U.S. Cl.
CPC ............ *G06F 1/3237* (2013.01); *G06F 1/324* (2013.01); *G06F 1/3278* (2013.01); *G06F 1/3284* (2013.01); *G06F 1/3287* (2013.01); *G06K 15/4055* (2013.01)

(58) Field of Classification Search
None
See application file for complete search history.

(56) References Cited

U.S. PATENT DOCUMENTS

| 2005/0156041 | A1* | 7/2005 | Wurzburg | G06K 7/0013 235/441 |
| 2008/0313481 | A1* | 12/2008 | Paljug | G06F 1/3209 713/323 |
| 2010/0127076 | A1* | 5/2010 | Hashimoto | B41J 29/393 235/382 |
| 2012/0257247 | A1* | 10/2012 | Yamasaki | G06K 15/4055 358/1.15 |
| 2013/0318383 | A1* | 11/2013 | Takizawa | G06F 1/3234 713/323 |

(Continued)

FOREIGN PATENT DOCUMENTS

JP 2015-34927 A 2/2015

*Primary Examiner* — Nitin C Patel
(74) *Attorney, Agent, or Firm* — Workman Nydegger

(57) ABSTRACT

An electronic apparatus operates in a normal mode and a power-saving mode. A smaller amount of electricity is consumed in the power-saving mode than in the normal mode. The electronic apparatus includes a control section and a connection interface to which a reader that reads information from an external storage medium is connectable. When the electronic apparatus transits from the normal mode to the power-saving mode, if the reader is connected to the connection interface, the control section transits to a first power-saving mode in which both the connection interface and the reader are operable, or if the reader is not connected to the connection interface, the control section transits to a second power-saving mode in which a lower amount of electricity is consumed than in the first power-saving mode.

7 Claims, 2 Drawing Sheets

(56) References Cited

U.S. PATENT DOCUMENTS

| | | | | |
|---|---|---|---|---|
| 2014/0164805 A1* | 6/2014 | Hasui | .................. | G06F 1/266 |
| | | | | 713/323 |
| 2015/0172924 A1* | 6/2015 | Hirano | ................ | H04N 1/4426 |
| | | | | 726/4 |
| 2015/0339560 A1* | 11/2015 | Mikami | ................. | G06F 21/45 |
| | | | | 358/1.14 |
| 2017/0052587 A1* | 2/2017 | Eun | ........................ | G06F 21/34 |
| 2017/0163830 A1* | 6/2017 | Goda | ............... | H04N 1/00891 |
| 2017/0230524 A1* | 8/2017 | Kawaguchi | ........ | H04N 1/00891 |

* cited by examiner

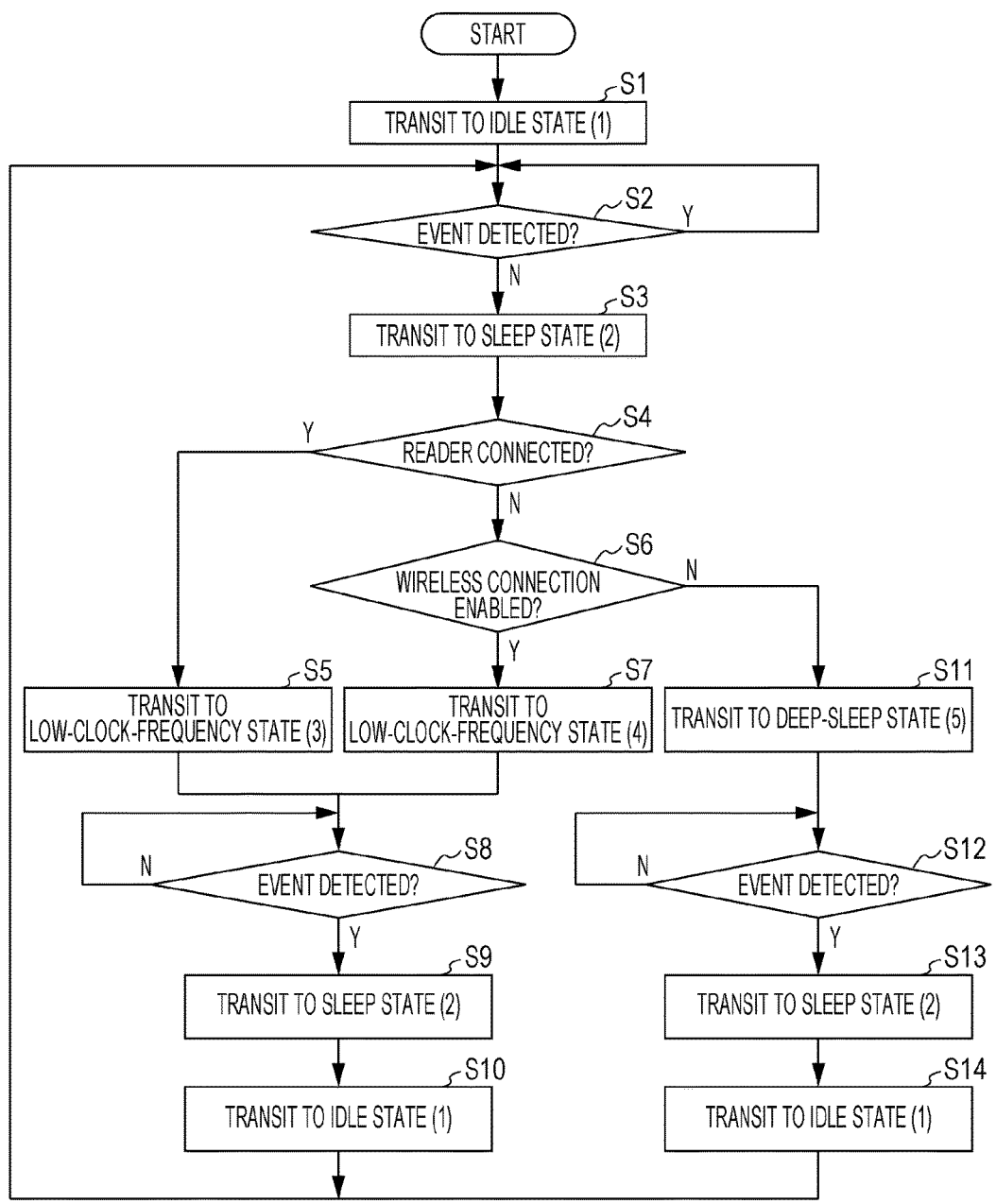

ADJUSTING POWER STATES FOR IMPROVED DEVICE PERFORMANCE

BACKGROUND

1. Technical Field

The present invention relates to an electronic apparatus and a control method.

2. Related Art

JP-A-2015-34927 discloses an image forming device that has a low-power consumption mode in which almost all functions of the CPU are halted. This low-power consumption mode is cleared in response to the reception of a print instruction.

Some contemporary printers are equipped with a reader that reads information from an IC (integrated circuit) card. When a printer of this type is in a low-power consumption mode, no electricity is supplied to the reader, which thus cannot read any information from an IC card. In order to cause the reader to read information from the IC card, a user disadvantageously needs to activate the printer by performing a predetermined operation to clear the low-power consumption mode.

SUMMARY

An advantage of some aspects of the invention is that an electronic apparatus and a control method provide a user with good usability. More specifically, the electronic apparatus can read information from an IC card or other external storage medium in a low-power consumption mode, and the control method controls such an electronic apparatus.

According to a first aspect of the invention, there is provided an electronic apparatus that operates in a normal mode and a power-saving mode. A smaller amount of electricity is consumed in the power-saving mode than in the normal mode. The electronic apparatus includes a control section and a connection interface to which a reader that reads information from an external storage medium is connectable. When the electronic apparatus transits from the normal mode to the power-saving mode, if the reader is connected to the connection interface, the control section transits to a first power-saving mode in which both the connection interface and the reader are operable, or if the reader is not connected to the connection interface, the control section transits to a second power-saving mode in which a lower amount of electricity is consumed than in the first power-saving mode. This configuration provides a user with good usability, because the electronic apparatus can read information from an IC card or other external storage medium with its power consumption lowered.

In the electronic apparatus described above, the control section may have a CPU and may set the number of clocks in the CPU in the first power-saving mode to be lower than that in the normal mode. This configuration enables the electronic apparatus to read a signal from a reader with its power consumption lowered.

In the electronic apparatus described above, the control section may stop an operation of the CPU in the second power-saving mode. This configuration enables the electronic apparatus to transit to a state in which the power consumption further decreases.

In the electronic apparatus described above, when the control section that has transited to the first power-saving mode detects a signal that the connection interface outputs in response to the reading of the information from the external storage medium, the control section may transit from the first power-saving mode to the normal mode. This configuration enables the electronic apparatus to perform the process related to the information after having read information from an IC card or other external storage medium with its power consumption lowered.

The electronic apparatus described above may further include a wireless communication section that communicates with an external apparatus in a wireless manner. When the electronic apparatus transits from the normal mode to the power-saving mode, if the reader is not connected to the connection interface but a wireless connection made by the wireless communication section is enabled, the control section may transit to a third power-saving mode in which a smaller amount of electricity is consumed in the first power-saving mode and in which a larger amount of electricity is consumed in the second power-saving mode. This configuration enables the electronic apparatus to, when a wireless connection is enabled, receive information from an external device via the wireless connection with its power consumption lowered.

The electronic apparatus described above may further include a wireless communication section that communicates with an external apparatus in a wireless manner. When the electronic apparatus transits from the normal mode to the power-saving mode, if the reader is not connected to the connection interface and a wireless connection made by the wireless communication section is disabled, the control section may transit to the second power-saving mode. This configuration enables the electronic apparatus to, when the wireless connection is disabled, transit to a state in which the power consumption further decreases.

In the electronic apparatus described above, before the electronic apparatus transits from the normal mode to the first power-saving mode or the second power-saving mode, the control section may transit to a fourth power-saving mode in which a lower amount of electricity is consumed than in the normal mode and in which a larger amount of electricity is consumed than in the first power-saving mode, and may determine whether the reader is connected to the connection interface. This configuration enables the electronic apparatus to make the determination with its power consumption lowered before the electronic apparatus transits to the first power-saving mode or the second power-saving mode.

According to a second aspect of the invention, there is provided a method of controlling an electronic apparatus that operates in a normal mode and a power-saving mode. A smaller amount of electricity is consumed in the power-saving mode than in the normal mode. The electronic apparatus includes a connection interface to which a reader that reads information from an external storage medium is connectable. The method includes, when the electronic apparatus transits from the normal mode to the power-saving mode, causing the electronic apparatus to transit to a first power-saving mode if the reader is connected to the connection interface or to a second power-saving mode if the reader is not connected to the connection interface. Both the connection interface and the reader are operable in the first power-saving mode. A lower amount of electricity is consumed in the second power-saving mode than in the first power-saving mode. This configuration provides a user with good usability, because the electronic apparatus can read information from an IC card or other external storage medium with its power consumption lowered.

BRIEF DESCRIPTION OF THE DRAWINGS

The invention will be described with reference to the accompanying drawings, wherein like numbers reference like elements.

FIG. 3 is a flowchart of an example of an operation of the printer illustrated in FIG. 1.

DESCRIPTION OF EXEMPLARY EMBODIMENTS

An embodiment of the invention will be described below with reference to the accompanying drawings. This embodiment relates to a printer, which is one example of an electronic apparatus.

Figure 1:
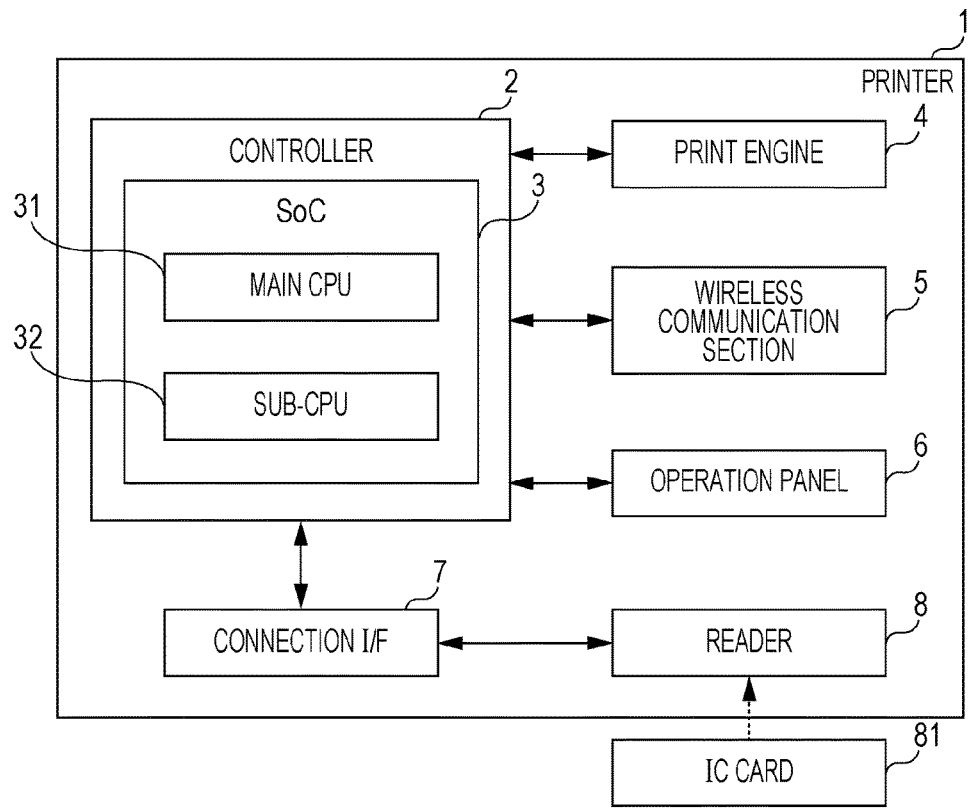
FIG. 1 is a block diagram illustrating an example of a configuration of a printer according to an embodiment of the invention.

FIG. 1 illustrates an example of functional blocks of a configuration of a printer in this embodiment.

The printer 1 includes a controller 2, a print engine 4, a wireless communication section 5, an operation panel 6, and a connection interface 7 (abbreviated below as the connection I/F 7). Herein, the controller 2 corresponds to a control section. This printer 1 supports the connection of a reader 8 thereto as a user's option.

The controller 2 controls the overall operation of the printer 1. The controller 2 can be implemented using a computer that includes a SoC 3 (System on a Chip), a volatile storage unit, a nonvolatile storage unit, an interface circuit, and a bus. The SoC 3 may be provided with an arithmetic logic unit, such as a CPU (central processing unit). The volatile storage unit may be RAM (random access memory). The nonvolatile storage unit may be ROM (read only memory). The interface circuit may be used to connect the controller 2 to other units. The bus may be used to interconnect these components. Obviously, the controller 2 may include various processing circuits, including an image processing circuit. The SoC 3 includes a main CPU 31 and a sub-CPU 32, for example. For example, the sub-CPU 32 may have a smaller and simpler circuit than the main CPU 31 and may run on a lower amount of electricity than the main CPU 31.

The main CPU 31 operates in accordance with a program stored in the ROM or another storage area, functioning as a power-saving management section, a network connection determination section, and a reader connection determination section.

The power-saving management section controls an operating state of the printer 1, depending on the occurrences of various events.

The network connection determination section determines whether the wireless connection is enabled.

The reader connection determination section determines whether the reader 8 is connected to the connection I/F 7.

The sub-CPU 32 operates in accordance with a program stored in the ROM or another storage area, thereby functioning as a main CPU activation section and an operation panel control section.

The main CPU activation section activates the main CPU 31 in response to the detection of an event.

The operation panel control section turns off the backlight of the display in the operation panel 6 when the printer 1 is in a sleep state; details of the sleep state will be described later.

Both the main CPU 31 and the sub-CPU 32 read one or more programs stored in the ROM and executing these programs on the RAM, thereby realizing at least some of the above functions of the controller 2. As an example, these programs may be read from a portable storage medium and installed in the printer 1. As another example, the programs may be downloaded from a server via a network and installed in the printer 1. Alternatively, the processing circuits, including the image processing circuit, or the combination of the main CPU 31, the sub-CPU 32, and the processing circuits may realize at least some of the functions of the controller 2.

The print engine 4 creates an image on a print medium in accordance with an instruction from the controller 2. The print engine 4 may be an ink jet or laser type of print engine and includes mechanical components, a sensor, a motor, a drive circuit, and a control circuit, for example.

The wireless communication section 5 is a communication module that has a communication function conforming to, for example a Wi-Fi specification, which is one of wireless LAN specifications. The controller 2 communicates with an external apparatus, such as a PC (personal computer), via the wireless communication section 5.

The operation panel 6 receives a user's operation and outputs an operation signal to the controller 2 in accordance with the user's operation. In addition, the operation panel 6 displays the result of a process performed by the controller 2 in the form of letters, a graph, a table, animation, an image, and others. Alternatively, the operation panel 6 may output sound as the process result from the controller 2. The operation panel 6 may be implemented using an input device and an output device; for example, the input device may include keys, a touch sensor, and a touch panel, and the output device may include an LCD (liquid crystal display) or an OLED (organic electro-luminescence display) and speakers.

The connection I/F 7 is an interface used to connect the reader 8 to the printer 1. As an example, the connection I/F 7 may be an interface device that makes the connection and conducts communication in conformity with USB (universal serial bus) specifications. The controller 2 controls the reader 8 and acquires read data therefrom via the connection I/F 7. The controller 2 realizes predetermined functions, including user authentication, for example, in conjunction with the reader 8. Instead of the reader 8, a reader/writer may be connected to the connection I/F 7.

The reader 8 is a reading device that reads information from an external storage medium. The reader 8 communicates with an IC chip mounted in, for example an IC (integrated circuit) card 81 in a contact or noncontact manner. The reader 8 may conform to NFC (Near Field Communication) specifications, for example. When the IC chip is placed near the reader 8, for example, the reader 8 can supply electricity to the IC chip by means of electromagnetic induction, thereby operating the IC chip. Then, the reader 8 reads data from the IC chip and outputs the data to the connection I/F 7.

In this embodiment, the printer 1 can operate in a plurality of operating states, which are also referred to as the "operating modes". These operating states include five states; an idle state (1), a sleep state (2), a low-clock-frequency state (3), a low-clock-frequency state (4), and a deep-sleep state (5), whose power consumptions decrease in this order. Alternatively, the power consumptions in the low-clock-frequency states (3) and (4) may be substantially the same as each other. Herein, the idle state (1) corresponds to a "normal mode"; the sleep state (2) corresponds to a "fourth power-saving mode"; the low-clock-frequency state (3) corresponds to a "first power-saving mode"; the low-clock-frequency state (4) corresponds to a "third power-saving mode"; and the deep-sleep state (5) corresponds to a "second power-saving mode".

The idle state (1) is, for example a standby state in which the printer 1 is ready to perform a print process in response to a print instruction. For example, the controller 2, the print engine 4, the wireless communication section 5, the operation panel 6, and the connection I/F 7 may be supplied with electricity and thus may be operable. More specifically, for example, the wireless communication section 5 may have established the wireless connection with an AP (access point) and be ready to communicate with a PC and other devices in a wireless manner, and the reader 8 may be supplied with electricity from the connection I/F 7.

The sleep state (2) is, for example a state in which some of the units in the printer 1 are set to a power-saving state. For example, both the print engine 4 and the operation panel 6 may be set to the power-saving state. More specifically, some of the mechanisms in the print engine 4 may be set to a stopped state, and the backlight of the display in the operation panel 6 may be set to a shutoff state.

Each of the low-clock-frequency states (3) and (4) is similar to the sleep state, for example, but the number of operation clocks in the main CPU 31 is set to be smaller than those in both the idle and sleep states. For example, the number of operation clocks in the main CPU 31 in each of the low-clock-frequency states (3) and (4) may be $\frac{1}{10}$ or less smaller than that in the idle state. Furthermore, when the printer 1 is in the low-clock-frequency state (4), the connection I/F 7 may be set to the power-saving state or the power-off state.

The deep-sleep state (5) is, for example a state in which the main CPU 31 and some of the units in the printer 1 are set to the power-off state. For example, the main CPU 31, the print engine 4, the operation panel 6, the connection I/F 7, and the RAMs and other storage devices provided in the controller 2 may be set to the power-off state, and the wireless communication section 5 may be set to the power-saving state. However, for example, the sub-CPU 32 is set to an active state. In the deep-sleep state (5), the sub-CPU 32 monitors whether the power button and other predetermined buttons are operated or whether a signal, such as a signal response to a wake-up signal coming via a wireless LAN, is output from the wireless communication section 5, for example.

The SoC 3 controls the transition between the above operating states of the printer 1, details of which will be described below.

Figure 2:
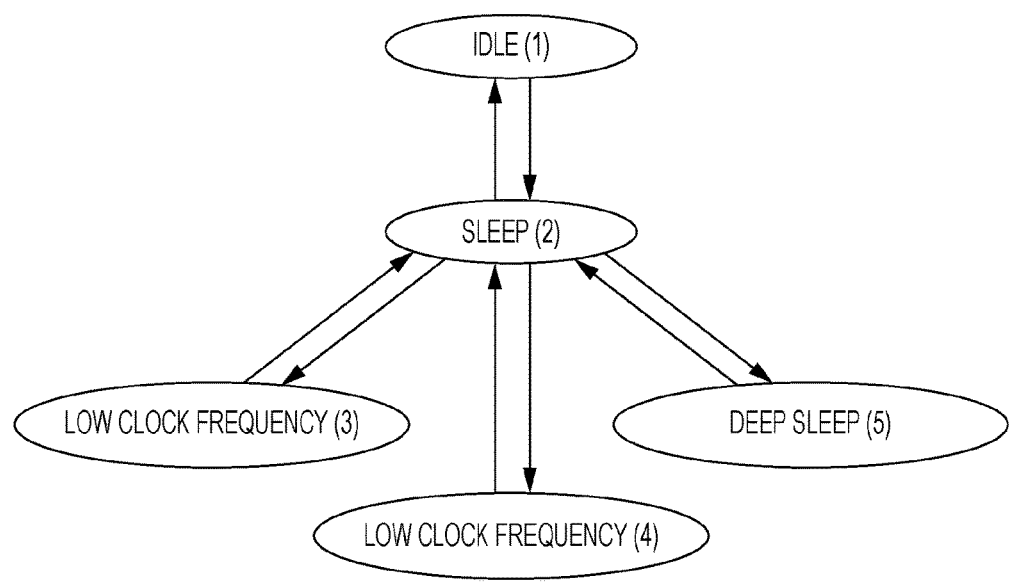
FIG. 2 is a diagram illustrating the transition between operating states of the printer illustrated in FIG. 1.

FIG. 2 is a diagram illustrating an example of the transition between the operating states of the printer 1.

The printer 1 can transit directly between the idle state (1) and the sleep state (2), between the sleep state (2) and the low-clock-frequency state (3), between the sleep state (2) and the low-clock-frequency state (4), and between the sleep state (2) and the deep-sleep state (5). However, the printer 1 cannot transit directly from the low-clock-frequency state (3) to the idle state (1), from the low-clock-frequency state (4) to the idle state (1), and from the deep-sleep state (5) to the idle state (1), and therefore the printer 1 needs to transit to the sleep state (2) once.

FIG. 3 is a flowchart of an example of an operation of the printer 1. More specifically, FIG. 3 illustrates a process in which the controller 2 controls the transition between the operating states of the printer 1.

At Step S1, the printer 1 is powered on, and the power-saving management section of the controller 2 enters the idle state (1). In this case, for example, the controller 2, the print engine 4, the wireless communication section 5, the operation panel 6, and the connection I/F 7 may be supplied with electricity and thus may be operable. If the reader 8 is connected to the connection I/F 7, the connection I/F 7 supplies electricity to the reader 8.

At Step S2, the power-saving management section of the controller 2 that has been in the idle state (1) monitors whether any event occurs. For example, the power-saving management section of the main CPU 31 may monitor whether to receive a process request, such as a print instruction, as an occurrence of an event. When detecting the process request (Y at Step S2), the power-saving management section of the main CPU 31 performs the process related to the process request, such as a print process, and then continues the monitoring. When detecting no process requests over a preset period, such as five minutes, (N at Step S2), the power-saving management section of the main CPU 31 makes the processing proceed to Step S3.

When detecting no events over the preset period (N at Step S2), the power-saving management section of the controller 2 transits to the sleep state (2) at Step S3. For example, as described above, the power-saving management section of the main CPU 31 may set some of the units in the printer 1 to the power-saving state.

At Step S4, the reader connection determination section of the controller 2 determines whether the reader 8 is connected to the connection I/F 7. For example, the reader connection determination section of the main CPU 31 may detect whether any device is connected to the connection I/F 7.

When the reader 8 is connected to the connection I/F 7 (Y at Step S4), the power-saving management section of the controller 2 transits to the low-clock-frequency state (3) at Step S5. For example, the power-saving management section of the main CPU 31 may decrease the number of operation clocks in the main CPU 31, as described above.

When determining that the reader 8 is not connected to the connection I/F 7 (N at Step S4), the network connection determination section of the controller 2 determines whether the wireless connection is enabled at Step S6. For example, the network connection determination section of the main CPU 31 may determine whether the Wi-Fi function of the printer 1 is set to the active state.

When determining that the wireless connection is enabled (Y at Step S6), the power-saving management section of the controller 2 transits to the low-clock-frequency state (4) at Step S7. For example, the power-saving management section of the main CPU 31 may decrease the number of operation clocks in the main CPU 31, as described above. In addition, the power-saving management section of the main CPU 31 may set the connection I/F 7 to the power-saving state or the power-off state.

The power-saving management section of the controller 2 that has been in the low-clock-frequency state (3) or (4) monitors whether any event occurs at Step S8. As one example, when the reader 8 is connected to the connection I/F 7, the power-saving management section of the main CPU 31 that has been in the low-clock-frequency state (3) may monitor whether to receive a predetermined signal that the connection I/F 7 outputs in response to the reading of data from the IC card 81, as an occurrence of an event.

As another example, when the wireless connection is enabled, the power-saving management section of the main CPU 31 that has been in the low-clock-frequency state (3) or (4) may monitor whether to receive a process request, such as a print instruction, from the wireless communication section 5, as an occurrence of an event. As still another example, the power-saving management section of the main CPU 31 in the low-clock-frequency state (3) or (4) may monitor whether the operation panel 6 is operated. When detecting no events (N at Step S8), the power-saving management section of the main CPU 31 performs the process of Step S8.

When detecting an event (Y at Step S8), the power-saving management section of the controller 2 transits to the sleep state (2) at Step S9. For example, the power-saving management section of the main CPU 31 may increase the number of operation clocks in the main CPU 31 to the number that has been set in the idle state (1). When the reader 8 is not connected to the connection I/F 7, namely, when the controller 2 transits from the low-clock-frequency state (4) to the sleep state (2), the power-saving management section of the main CPU 31 may set the connection I/F 7 to the normal state or the power-saving state.

At Step S10, the power-saving management section of the controller 2 transits to the idle state (1). For example, the power-saving management section of the main CPU 31 may set the units in the printer 1 which have been in the power-saving state to the normal state. Then, the power-saving management section of the main CPU 31 performs the process related to the event detected at Step S8, such as a print process or a user authentication process. After that, the power-saving management section of the controller 2 performs the process of Step S2.

When determining that the wireless connection is disabled (N at Step S6), the power-saving management section of the controller 2 transits to the deep-sleep state (5) at Step S11. For example, the power-saving management section of the main CPU 31 may set the main CPU 31 and some of the units in the printer 1 to the power-off state.

The main CPU activation section of the controller 2 that has been in the deep-sleep state (5) monitors whether any event occurs at Step S12. As one example, the main CPU activation section of the sub-CPU 32 may monitor whether to receive a predetermined signal from the wireless communication section 5, as an occurrence of an event. As another example, the main CPU activation section of the sub-CPU 32 may monitor whether a predetermined button, such as a power button is operated, as an occurrence of an event. While detecting no events (N at Step S12), the main CPU activation section of the sub-CPU 32 performs the process of Step S12.

When the main CPU activation section of the controller 2 detects an event (Y at Step S12), the power-saving management section of the controller 2 transits to the sleep state (2) at Step S13. For example, the main CPU activation section of the sub-CPU 32 may activate the main CPU 31. In addition, the power-saving management section of the activated main CPU 31 may activate the units in the printer 1 which have been in the power-off state, and then may set the activated units to the power-saving state.

The power-saving management section of the controller 2 transits to the idle state (1) at Step S14. For example, the power-saving management section of the main CPU 31 may set the units in the printer 1 which have been in the power-saving state to the normal state. Then, the power-saving management section of the main CPU 31 performs the process of Step S2 again.

The embodiment of the invention has been described. In this embodiment, for example, when the printer 1 enters the power-saving mode, if the reader 8 is connected to the connection I/F 7, the controller 2 transits to the low-clock-frequency state (3) in which the reader 8 is operable. However, if the reader 8 is not connected, the controller 2 transits to the deep-sleep state (5) in which the power consumption decreases. In this way, the printer 1 reads information from an IC card and other external storage medium with its power consumption lowered, thereby making it possible to provide a user with good usability.

For example, when the controller 2 in the printer 1 is in the low-clock-frequency state (3), the controller 2 decreases the number of clocks in the main CPU 31. In this way, the main CPU 31 can detect a signal from the reader 8 with the power consumption lowered. For example, when the controller 2 in the printer 1 is in the deep-sleep state (5), the controller 2 stops an operation of the main CPU 31. In this way, the printer 1 can transit to a state in which the power consumption further decreases.

For example, when the controller 2 in the printer 1 in the low-clock-frequency state (3) detects a signal from the reader 8, the controller 2 transits to the normal mode. In this way, the printer 1 can read information from an IC card or other external storage medium with its power consumption lowered and then perform the process related to this information in the normal state.

For example, when the controller 2 in the printer 1 transits to the power-saving mode, if the reader 8 is not connected to the connection I/F 7 but the wireless connection is enabled, the controller 2 transits to the low-clock-frequency state (4) in which the reader 8 is operable. However, if the reader 8 is not connected and the wireless connection is disenabled, the controller 2 transits to the deep-sleep state (5) in which the power consumption further decreases. In this way, when the wireless connection is enabled, the printer 1 can receive information from an external device via the wireless connection with its power consumption lowered. Furthermore, when the wireless connection is disabled, the printer 1 transits to a state in which the power consumption further decreases.

For example, when the printer 1 transits to the power-saving mode, the controller 2 transits to the sleep state (2) and determines whether the reader 8 is connected to the connection I/F 7. In this way, the controller 2 in the printer 1 makes the determination with the power consumption lowered before transiting to the low-clock-frequency state (3) or (4) or the deep-sleep state (5).

It should be noted that the invention is not limited to the foregoing embodiment and various modifications are possible without departing from the spirit of the invention. For example, the embodiment may be modified in the following manner. Further, one or more of the embodiment and the modifications may be combined as appropriate.

For example, the main CPU 31 may monitor whether any event occurs after having transited to the sleep state (2) at Step S3. When detecting no occurrences of events over a preset period, such as five minutes, the main CPU 31 may perform the process of the Step S4. When detecting an event, the main CPU 31 may transit to the idle state (1) and perform the process related to the event.

For example, the printer 1 does not necessarily have to perform the processes of Steps S6 and S7. More specifically, when determining that the reader 8 is not connected to the connection I/F 7 (N at Step S4), the main CPU 31 may make the processing proceed to Step S11.

In the foregoing embodiment, the configuration of the printer 1 is separated into some components in accordance with their functions, as illustrated in FIG. 1. However, the components are determined for the purpose of helping an understanding of the configuration; therefore, it should be understood that the method of separating the configuration and the names of the components are not intended to limit the invention in this application. Alternatively, the configuration of the printer 1 may be separated into even more components in accordance with their functions, and each component may have a plurality of functions. The function of each component may be implemented in one or more hardware elements. The functions of each component and processes performed thereby are not limited to those described above, provided that it is possible to achieve an object and effect of the invention.

In the foregoing embodiment, likewise, the process performed by the printer 1 is separated into some steps in accordance with their process contents, as illustrated in FIG. 3. However, the steps are determined for the purpose of helping an understanding of the process; therefore, it should be understood that the method of separating the process and the names of the steps are not intended to limit the invention in this application. Alternatively, the process performed by the printer 1 may be separated into even more steps in accordance with their process contents. Multiple processes may be performed at each step. Moreover, the process sequence is not limited to that in the flowchart of FIG. 3.

The electronic apparatus in the invention is not limited to a printer. Examples of the electronic apparatus include a scanner, a multifunctional printer, a projector, a television, a video recorder, and other apparatuses that operate in a plurality of operating states and allow a reader to be connected thereto.

The entire disclosure of Japanese Patent Application No. 2016-074038, filed Apr. 1, 2016 is expressly incorporated by reference herein.

What is claimed is:

1. An electronic apparatus that operates in a normal mode and a power-saving mode, a smaller amount of electricity being consumed in the power-saving mode than in the normal mode, the electronic apparatus comprising:
   a control section; and
   a connection interface to which a reader that reads information from an external storage medium is connectable,
   wherein when the electronic apparatus transits from the normal mode to the power-saving mode, if the reader is connected to the connection interface, the control section transits to a first power-saving mode in which both the connection interface and the reader are operable, or if the reader is not connected to the connection interface, the control section transits to a second power-saving mode in which a lower amount of electricity is consumed than in the first power-saving mode, and
   wherein before the electronic apparatus transits from the normal mode to the first power-saving mode or the second power-saving mode, the control section transits to a fourth power-saving mode in which a lower amount of electricity is consumed than in the normal mode and in which a larger amount of electricity is consumed than in the first power-saving mode, and then determines whether the reader is connected to the connection interface.

2. The electronic apparatus according to claim 1, wherein the control section has a CPU, and the control section sets a number of clocks in the CPU in the first power-saving mode to be lower than that in the normal mode.

3. The electronic apparatus according to claim 2, wherein the control section stops an operation of the CPU in the second power-saving mode.

4. The electronic apparatus according to claim 1, wherein when the control section that has transited to the first power-saving mode detects a signal that the connection interface outputs in response to the reading of the information from the external storage medium, the control section transits from the first power-saving mode to the normal mode.

5. The electronic apparatus according to claim 1, further comprising:
   a wireless communication section that communicates with an external apparatus in a wireless manner,
   wherein when the electronic apparatus transits from the normal mode to the power-saving mode, if the reader is not connected to the connection interface but a wireless connection made by the wireless communication section is enabled, the control section transits to a third power-saving mode in which a smaller amount of electricity is consumed than in the first power-saving mode and in which a larger amount of electricity is consumed than in the second power-saving mode.

6. The electronic apparatus according to claim 1, further comprising a wireless communication section that communicates with an external apparatus in a wireless manner, wherein when the electronic apparatus transits from the normal mode to the power-saving mode, if the reader is not connected to the connection interface and a wireless connection made by the wireless communication section is disabled, the control section transits to the second power-saving mode.

7. A method of controlling an electronic apparatus that operates in a normal mode and a power-saving mode, a smaller amount of electricity being consumed in the power-saving mode than in the normal mode, the electronic apparatus including a connection interface to which a reader that reads information from an external storage medium is connectable, the method comprising:
   when the electronic apparatus transits from the normal mode to the power-saving mode, causing the electronic apparatus to transit to a first power-saving mode if the reader is connected to the connection interface or to a second power-saving mode if the reader is not connected to the connection interface,
   wherein both the connection interface and the reader are operable in the first power-saving mode,
   wherein a lower amount of electricity is consumed in the second power-saving mode than in the first power-saving mode, and
   wherein before the electronic apparatus transits from the normal mode to the first power-saving mode or the second power-saving mode, the electronic apparatus transits to a fourth power-saving mode in which a lower amount of electricity is consumed than in the normal mode and in which a larger amount of electricity is consumed than in the first power-saving mode, and then determines whether the reader is connected to the connection interface.

* * * * *